(12) United States Patent
Thimbleby

(10) Patent No.: US 11,380,028 B2
(45) Date of Patent: Jul. 5, 2022

(54) ELECTRONIC DRAWING WITH HANDWRITING RECOGNITION

(71) Applicant: Apple Inc., Cupertino, CA (US)

(72) Inventor: William J. Thimbleby, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/025,931

(22) Filed: Jul. 2, 2018

(65) Prior Publication Data

US 2020/0005500 A1  Jan. 2, 2020

(51) Int. Cl.
| | |
|---|---|
| *G06F 17/00* | (2019.01) |
| *G06T 11/20* | (2006.01) |
| *G06T 11/60* | (2006.01) |
| *G06F 40/166* | (2020.01) |
| *G06V 30/32* | (2022.01) |

(52) U.S. Cl.
CPC .......... *G06T 11/203* (2013.01); *G06F 40/166* (2020.01); *G06T 11/60* (2013.01); *G06V 30/347* (2022.01)

(58) Field of Classification Search
CPC ........ G06T 11/203; G06T 11/60; G06F 17/24; G06F 17/276; G06F 40/166; G06F 40/171; G06F 3/0482; G06F 3/04883; G06F 3/018; G06F 3/03545; G06K 9/00416
USPC ....................................................... 715/268
See application file for complete search history.

(56) References Cited

U.S. PATENT DOCUMENTS

| | | | | |
|---|---|---|---|---|
| 6,054,990 A | * | 4/2000 | Tran | G06F 3/0481 |
| | | | | 345/179 |
| 6,867,786 B2 | * | 3/2005 | Lui | G06F 17/242 |
| | | | | 345/173 |
| 2002/0005856 A1 | | 1/2002 | Sasaki | |
| 2004/0196313 A1 | * | 10/2004 | Wynn | G06F 40/171 |
| | | | | 715/779 |
| 2005/0219232 A1 | * | 10/2005 | Poll | G06F 3/04883 |
| | | | | 345/179 |
| 2006/0232597 A1 | * | 10/2006 | Davignon | G06T 11/60 |
| | | | | 345/581 |
| 2007/0146389 A1 | | 6/2007 | Distler | |
| 2007/0200873 A1 | | 8/2007 | Hsu | |
| 2007/0229526 A1 | * | 10/2007 | Hsu | G06F 9/451 |
| | | | | 345/581 |
| 2008/0273797 A1 | * | 11/2008 | Takikawa | G06F 3/03545 |
| | | | | 382/188 |
| 2008/0296074 A1 | * | 12/2008 | Hollstron | G06F 3/03545 |
| | | | | 178/19.01 |
| 2014/0047413 A1 | | 2/2014 | Sheive | |
| 2014/0250059 A1 | | 9/2014 | Gilra | |
| 2016/0154998 A1 | | 6/2016 | Robin | |
| 2017/0010802 A1 | * | 1/2017 | Xia | G06K 9/00436 |
| 2017/0236020 A1 | * | 8/2017 | Petkov | G06F 3/03545 |
| | | | | 345/179 |

(Continued)

*Primary Examiner* — Jason T Edwards
(74) *Attorney, Agent, or Firm* — BakerHostetler

(57) ABSTRACT

Aspects of subject technology provide systems and methods for electronic drawing with handwriting recognition. An electronic device may include one or more processors configured to receive a drawing stroke input, generate a bitmap of values that represent the drawing stroke input, render the bitmap for display by a display of the device, generate a vector representation of the drawing stroke input, and store the generated bitmap and the generated vector representation.

24 Claims, 9 Drawing Sheets

(56) References Cited

U.S. PATENT DOCUMENTS

| | | |
|---|---|---|
| 2017/0236021 A1 | 8/2017 | Petkov |
| 2018/0114059 A1 | 4/2018 | Ric |
| 2019/0130537 A1 | 5/2019 | Agrawal |
| 2019/0250800 A1 | 8/2019 | Coldham |

* cited by examiner

ELECTRONIC DRAWING WITH HANDWRITING RECOGNITION

TECHNICAL FIELD

The present description relates generally to electronic drawings systems and methods, and more particularly to electronic drawings with handwriting recognition.

BACKGROUND

Some electronic devices provide electronic drawing capabilities by which a user can enter drawing input using their finger on a touchscreen or touchpad, or using a stylus device on the touchscreen or touchpad, on a surface, or in three-dimensions in the air. The drawing input is stored in memory and can be displayed for viewing by the user, on a display of the electronic device.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
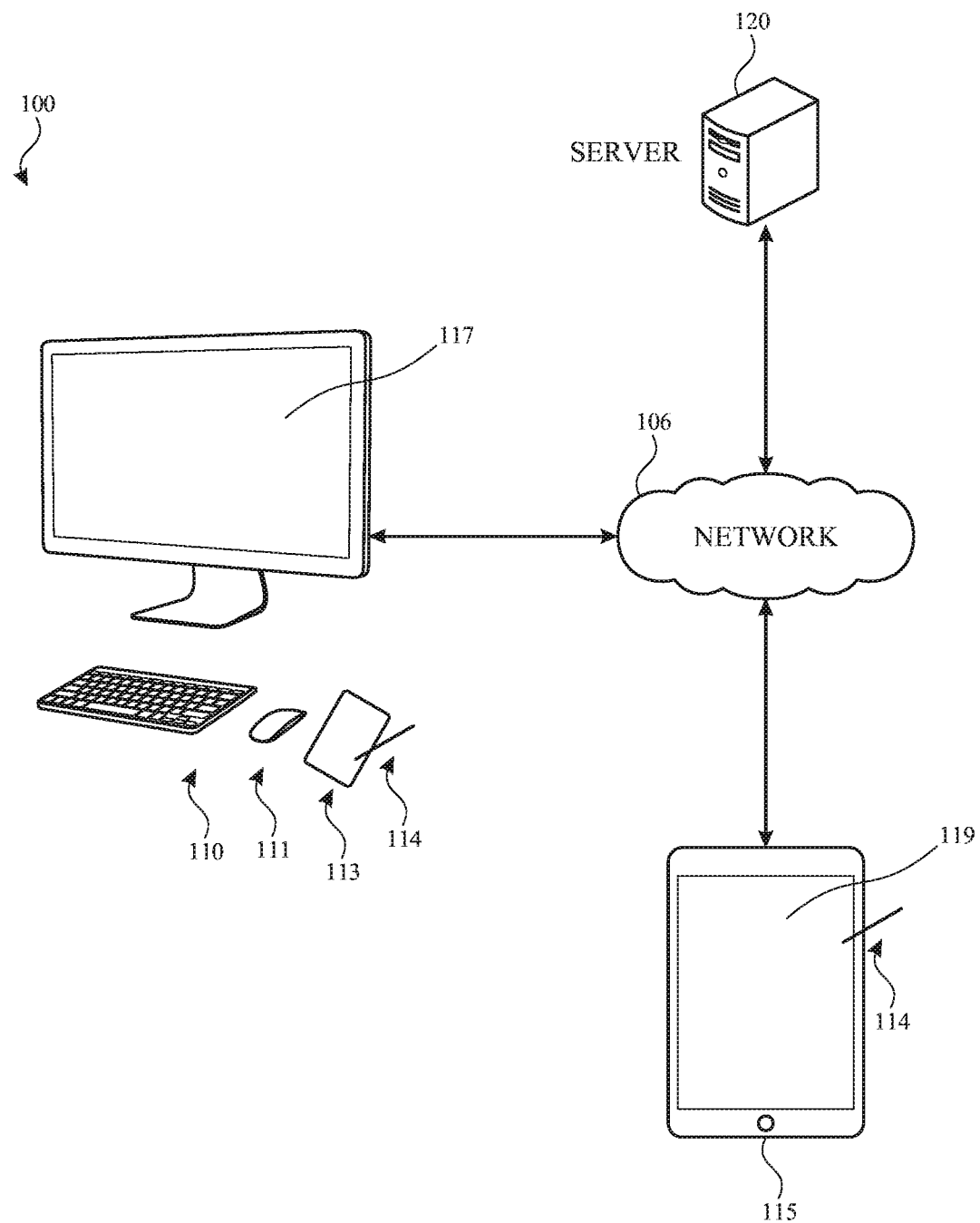
FIG. 1 illustrates an example network environment in which a system for electronic drawing with handwriting recognition may be implemented in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Electronic drawing applications for electronic devices may provide a user with the ability to provide drawing inputs using drawing input strokes and/or drawing modification strokes to erase portions of the drawing, smudge portions of the drawings, and/or select and move portions of the drawing. An input stroke such as a drawing stroke input or a drawing modification stroke may be provided by a user by, for example, sliding, tapping, pressing, or otherwise interacting with a touchscreen or touchpad using the user's finger, a stylus device, or another input device, sliding, tapping, pressing, or otherwise interacting a stylus device with a passive surface, moving a stylus device through the air, moving a mouse, clicking a button of a mouse or a stylus device, or otherwise providing a physical input to generate a corresponding spatial representation of the physical input in an electronic drawing.

Electronic drawing applications may include bitmap drawing applications that generate, store, and render bitmaps (e.g., arrays of bitmap pixel values) for display and editing, and vector drawing applications that generate, store, and render vector representations of drawing input strokes. Bitmap drawing applications generate and store a bitmap (e.g., a grid of bitmap pixel values such as in a .png file), and allow bitmap editing operations on the stored/displayed bitmap such as painting, erasing, smudging and filtering the bitmap pixel values. The stored bitmap directly corresponds to the image that is displayed by the display of the device. Bitmap editing operations modify the stored bitmap pixel values and the corresponding display pixel brightness and/or color. However, it can be difficult to recognize characters that have been drawn with a bitmap drawing application.

Electronic drawing applications may also include vector drawing applications that generate and store vector representations of a drawing stroke input. The vector representations may include one or more control points, one or more curves, and/or metadata that describes visual rendering features for the curve such as a line width, line style, color, or the like. The image that is displayed for the user is rendered based on the stored vector representation. Vector drawings allow the user delete entire strokes, and losslessly scale and rotate entire strokes or combinations of strokes. Vector representations can be used to efficiently detect hand drawn characters such letters and numbers. However, it can be difficult to provide seamless drawing features such as erasing and smudging with a vector representation, and erasures that remove strokes can make handwriting recognition difficult.

In some scenarios, erasing with vector representations may be provided by slicing a vector representation of a drawing stroke input (e.g., generating two vector representations on either side of the stroke) and re-rendering the displayed image based on the sliced vector. This vector slicing can be helpful for handwriting recognition with the vector representations, however, the image that is re-rendered and drawn from the sliced vector(s) may be visually displeasing to the user, particularly when relatively thicker strokes are rendered.

In other scenarios, some bitmap programs store a sequence of bitmap operations, which can facilitate vector-like drawing capabilities such as deletion of entire strokes. However, bitmap sequences of this type are often cached to avoid slow to re-rendering of the drawing, which can be memory and computationally intensive.

In contrast, and as described in further detail hereinafter, various aspects of the subject technology provide both a bitmap representation for display, and a vector representation for handwriting recognition. The vector representation may be independent of the bitmap representation. For example, the vector representation may include insufficient information for fully rendering a user's intended drawing, since the vector representation is not used for display. In this way, a visual bitmap editing experience is provided that is most natural to users, in combination with a background storage of a vector representation that is useful for handwriting recognition. Aspects of the present disclosure also provide an enhanced vector representation that can be used for both handwriting recognition and a bitmap-like drawing experience, without storing and displaying a bitmap representation.

FIG. 1 illustrates an example network environment 100 in which electronic drawing with handwriting recognition may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, an electronic device 115, and a server 120. The network 106 may communicatively (directly or indirectly) couple the electronic device 110 and/or the server 120, the electronic device 115 and/or the server 120, and/or the electronic device 110 and/or the electronic device 115.

In one or more implementations, the network 106 may be an interconnected network of devices that may include, or may be communicatively coupled to, the Internet. For explanatory purposes, the network environment 100 is illustrated in FIG. 1 as including an electronic device 110, an electronic device 115, and a server 120; however, the network environment 100 may include any number of electronic devices and any number of servers and/or each of electronic devices 110 and 115 can operate without a connection to network 106 or server 120.

The electronic device 110 may be, for example, a desktop computer, a portable computing device such as a laptop computer, a smartphone, a peripheral device (e.g., a digital camera, headphones), a tablet device, a wearable device such as a watch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 110 is depicted as a desktop computer that includes input devices that can be used as drawing input devices (e.g., a mouse 111, a touchpad 113, and/or a stylus device 114 that can be used with, or separately from touchpad 113) for providing drawing stroke inputs and drawing modification inputs to electronic device 110.

Electronic device 110 may also include a display 117 such as a non-touch display (e.g., a display having a display of pixels for displaying images) for displaying a bitmap or enhanced vector rendering of drawing inputs, or a touchscreen (e.g., a display having an array of display pixels for displaying images and a corresponding array of capacitive, resistive, or other touch sensor electrodes that receive touch-based input) that can be used for both receiving drawing inputs and displaying a bitmap or enhanced vector rendering of the drawing inputs. The electronic device 110 may be, and/or may include all or part of, the electronic system discussed below with respect to FIG. 13. In one or more implementations, the electronic device 110 may operate display 117 to display a bitmap rendering of drawing inputs while storing a background vector representation of the drawing inputs.

The electronic device 115 may include a display 119 such as a touchscreen and may be, for example, a portable computing device such as a laptop computer that includes a touchscreen, a smartphone that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In FIG. 1, by way of example, the electronic device 115 is depicted as a tablet device with a touchscreen. In one or more implementations, the electronic device 115 may be, and/or may include all or part of the electronic system discussed below with respect to FIG. 13. In one or more implementations, the electronic device 115 may be provided with a stylus device 114 that can be used (e.g., in addition to or alternatively to a user's finger) for providing drawing inputs to the touch sensor electrodes of display 119. In one or more implementations, the electronic device 110 may display a bitmap rendering of drawing inputs while storing a background vector representation of the drawing inputs.

Figure 2:
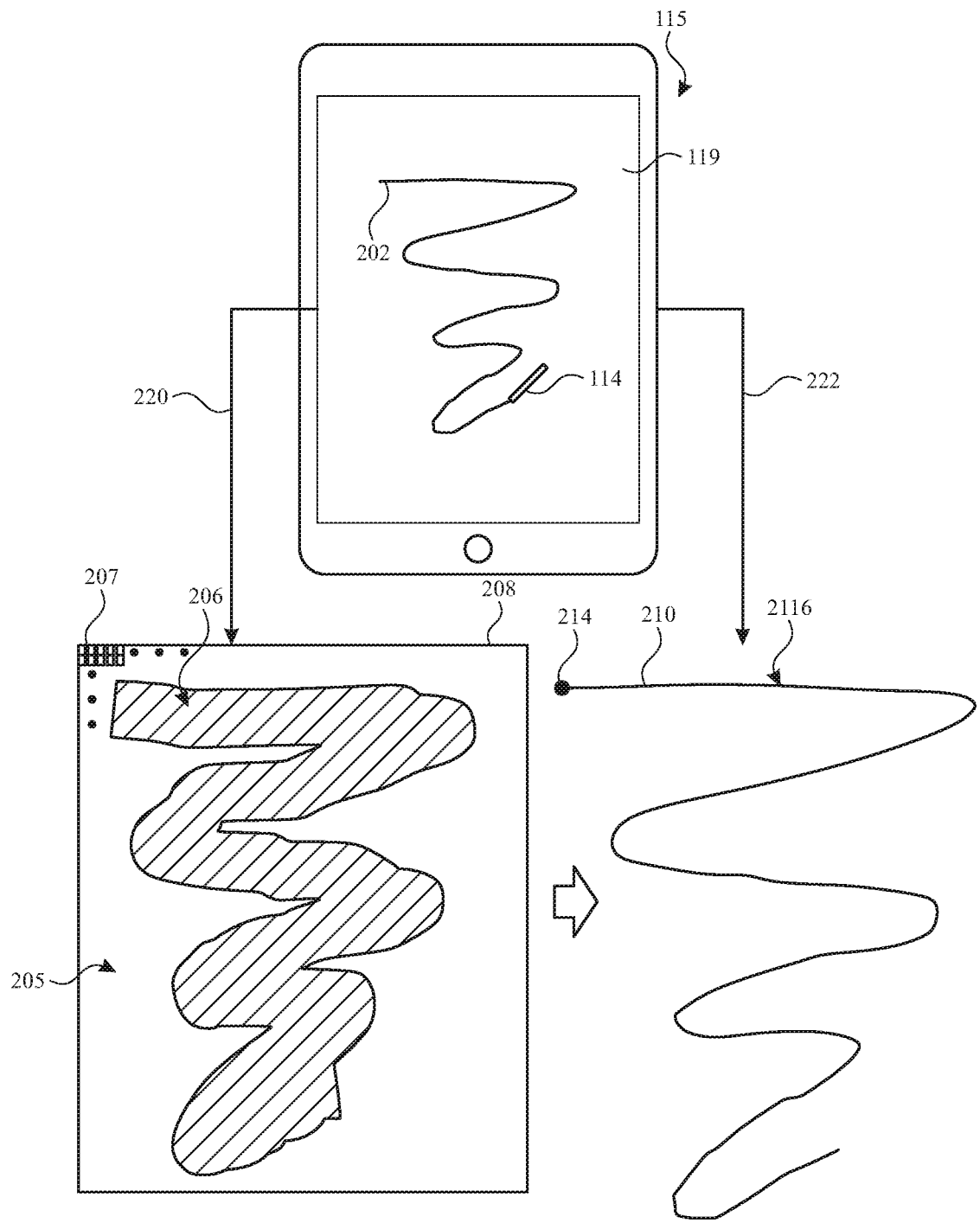
FIG. 2 illustrates a schematic diagram showing an exemplary entry of a drawing stroke input in accordance with one or more implementations.

FIG. 2 illustrates a schematic diagram showing entry of a drawing stroke input in accordance with one or more implementations. As shown in FIG. 2, stylus device 114 (or a user's finger or other input device) can be used to provide a drawing stroke input 202 to electronic device 115 (e.g., using touch sensor electrodes of display 119). As indicated by arrows 220 and 222 respectively, electronic device 115 generates a bitmap 208 and a vector representation 216 of the drawing stroke input 202. Bitmap 208 may be displayed by operating the array of display pixels of display 119 to display the rendered bitmap. Vector representation 216 is independent of bitmap 208 and, in one or more implementations, vector representation 216 includes insufficient information from which to render bitmap 208 (e.g., vector representation 216 may be free of visual representation metadata for rendering a displayed image that visually matches the rendered bitmap 208). For example, bitmap 208 may show a thick marker stroke and vector representation 216 may include one or more control points, such as control point 214, and a curve such as curve 210 (e.g., a curve representing a thin line). Vector representation 216 may also include one or more offset values that describe the location of curve 210 relative to, for example, an origin or a control point for another curve or portion of a curve. Curve 210 may be stored as a mathematical representation of a thin line that is not rendered for display. For example, curve 210 may be a b-spline curve, a set of b-spline curves, or one or more other curves that describe, for example, a thin line at the center of the drawing stroke input. Vector representation 216 may be free of metadata such as line style, line thickness, texture, color, etc. that would typically be stored for rendering of a vector drawing.

As shown in FIG. 2, vector representation 216 may be generated directly from the drawing input stroke or from the bitmap 208. Bitmap 208 may include an array of bitmap pixel values 207. Bitmap pixel values 207 may correspond to background values or values 206 that represent a color, a brightness, or other aspect of a portion of drawing stroke input 202 that corresponds to the location of the bitmap pixel value 207. Bitmap pixel values 207 may each be used to operate one or more corresponding display pixels of display 119 to display an image corresponding to the drawing input stroke.

When multiple drawing stroke inputs are received, electronic device 115 may generate a vector storage of a sequence of bitmap operations and then render this sequence of bitmap operations to both bitmap 208 for display and to vector representation 216 (e.g., for character recognition). In this way, a visual bitmap editing experience is provided along with a vector representation 216 that is useful for handwriting recognition. New drawing strokes may be added whole to the vector representation 216 as a thin line. For example, each stroke in the vector representation 216 may include a pointer to the original stroke, a start and end parameter for the visible segment of that stroke, and an offset. An original stroke may be added with the start and end parameters as the start and end of that original stroke, and a zero offset.

Editing inputs by the user after bitmap 208 is displayed may include erase strokes that cause portions of values 206 to be set to background values 205, smudge strokes that cause bitmap pixel values 207 to be spread among neighboring pixels (e.g., using multi-pixel smoothing function), or other editing input such as selection and move, selection and erase, selection and rescale, selection and restyle, or other editing inputs. As described in further detail hereinafter, such editing inputs also cause changes to vector representation 216 that are not reflected in any displayed rendering.

Handwriting recognition operations may be performed periodically, responsive to a user's request, or responsive to a new drawing stroke input or editing input to recognize text associated with the drawing stroke input 202 based on the stored vector representation. Handwriting recognition operations may include a collection/iteration over all the vector strokes in vector representation 216 (and/or a modified version of vector representation 216 as described hereinafter), and each stroke may have its own iterator over the points along the spline segment of that stroke.

Figure 3:
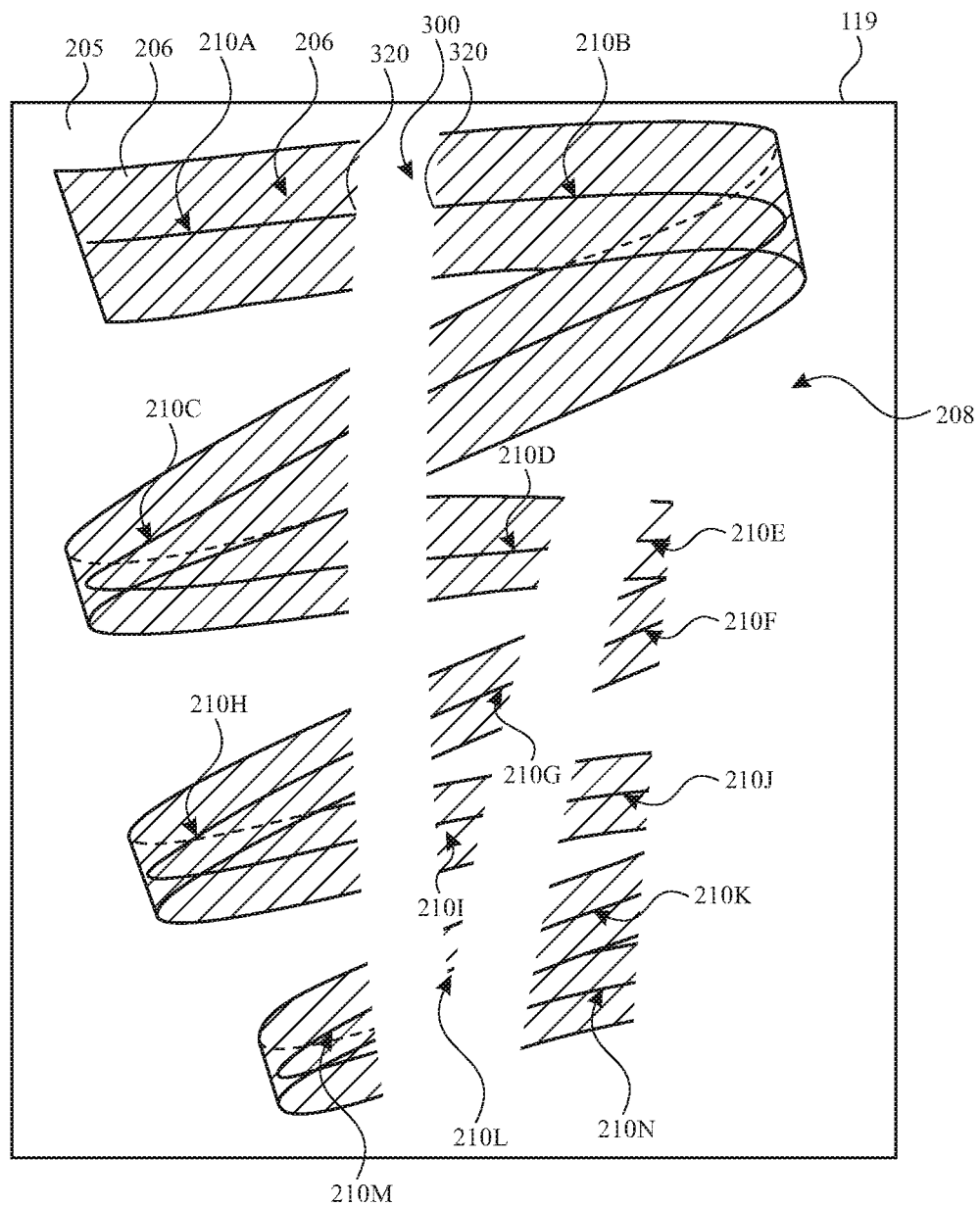
FIG. 3 illustrates a schematic diagram showing the effect of an erase stroke on a rendered bitmap and an associated vector representation of the drawing stroke input in accordance with one or more implementations.

FIG. 3 illustrates a displayed rendering of bitmap 208 on display 119. In the example of FIG. 3, vector representation 216 is shown overlaid on bitmap 208, although vector representation 216 may not be visually displayed on display 119 in an operational scenario. However, the depiction of vector representation 216 in FIG. 3 shows how vector representation 216 may be a curve that, if rendered, would form a thin line at or near the center of the bitmap pixel values 207 of bitmap 208 corresponding to drawing stroke input 202.

In the example of FIG. 3, a modification input in the form of an erase stroke 300 has been received for the drawing stroke input 202. As shown, responsive to receiving erase stroke 300, electronic device 115 modifies the values 206 of the stored bitmap 208 over which the erase stroke 300 passes (e.g., by setting values of that portion of the bitmap 208 that intersects the erase stroke 300 to background values 205). Electronic device 115 also modifies the stored vector representation 216 based on the modification input (e.g., the stored erase stroke 300 in FIG. 3). The modified values of the stored and rendered bitmap 208 are modified based on the modification input and independent of the modification to the stored vector representation 216.

As shown in FIG. 3, vector representation 216 is modified responsive to erase stroke 300 by splitting the stored vector representation of the bitmap (e.g., splitting curve 210) into a first portion on a first side of the erasure stroke and a second portion on a second side of the erasure stroke at each location at which the erase stroke 300 cuts through the curve 210. The example of FIG. 3 includes corresponding first and second portions 210A and 210B, corresponding first and second portions 210B and 210C, corresponding first and second portions 210C and 210D, corresponding first and second portions 210D and 210E, corresponding first and second portions 210E and 210F, corresponding first and second portions 210F and 210G, corresponding first and second portions 210G and 210H, corresponding first and second portions 210H and 210J, corresponding first and second portions 210J and 210K, corresponding first and second portions 210K and 210L, corresponding first and second portions 210L and 210M, and corresponding first and second portions 210M and 210N on opposing sides of a portion of erase stroke 300, though this is merely illustrative.

As shown, electronic device 115 may split the stored vector representation into the first portion on the first side of the erasure stroke and the second portion on the second side of the erasure stroke by, for example, for each instance at which the erase stroke 300 passes through the curve, identifying new control points 320 along curve 210 corresponding to the edges of the erase stroke and setting new control points 320 as endpoints for first and second valid ranges of curve 210. For example, curve 210 of the vector representation may remain unchanged, except that certain ranges of the curve other than portions 210A-210N are invalidated (e.g., prevented from consideration in a character/handwriting recognition operation for the electronic drawing).

Figure 4:
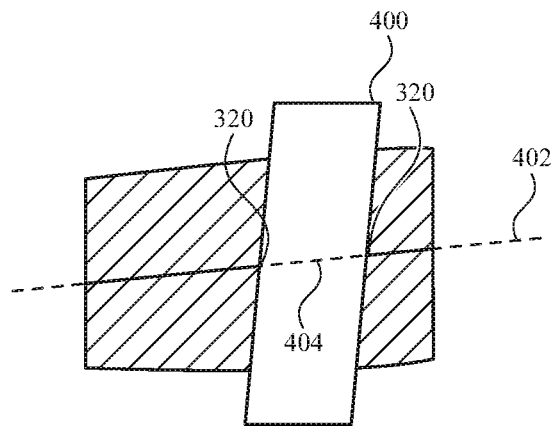
FIG. 4 illustrates a schematic diagram illustrating various polygons that may be generated for modifying a vector representation of a drawing stroke input based on an erase stroke in accordance with one or more implementations.

FIG. 4 illustrates new control points 320 that may be identified by electronic device 115 by converting erase stroke 300 to a vector outline such as an outline polygon 400, and then intersecting the vector representation 216 (e.g., the b-spline curve of the vector rendering) of drawing stroke input 202, and/or any other drawing strokes, with outline polygon 400. Electronic device 115 then replaces any intersecting stroke with zero or more new segments pointing to the same original stroke. Intersecting of outline polygon 400 with curve 210 may include flattening curve 210 (e.g., the b-spline curve) to a polygon 402 with added metadata, then using a polygon Boolean operations library to perform an intersection of outline polygon 400 and polygon 402. Intersection using the Boolean operations library generates metadata of an intersected polygon 404 that is used to create the intersected b-spline segments defined by new control points 320. In this way, the erase stroke 300 can be subtracted from all intersecting strokes in the vector representation of all drawing strokes.

Text associated with the drawing stroke input 202 may be recognized, based on the vector representation 216, prior to receiving the erase stroke 300 and/or after receiving the erase stroke 300 and modifying vector representation 216 as described.

Figure 5A:
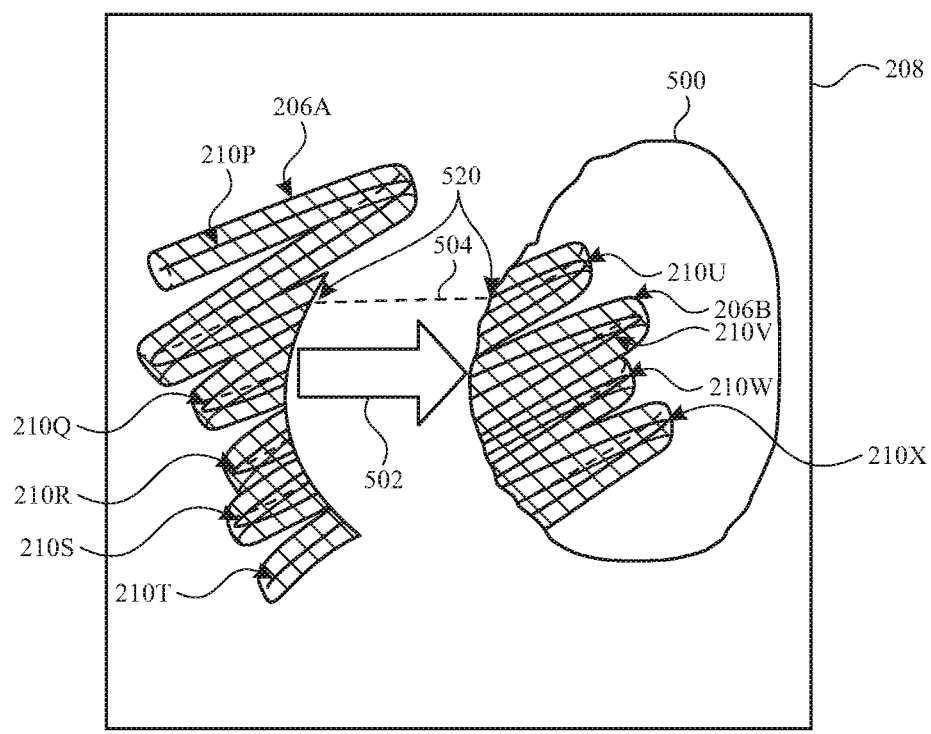
FIG. 5A illustrates a schematic diagram showing the effect of a select and move operation on a rendered bitmap and an associated vector representation of the drawing stroke input in accordance with one or more implementations.
Figure 5B:
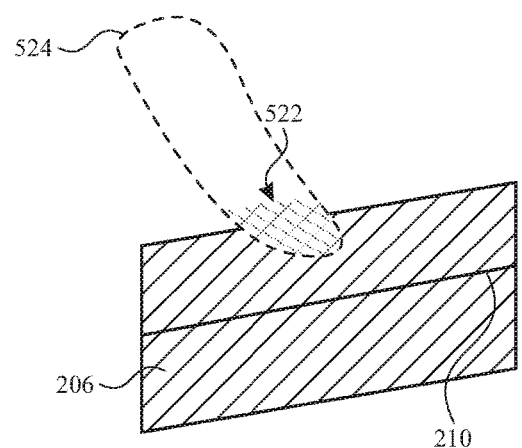
FIG. 5B illustrates a schematic diagram showing the effect of a smudge or blur operation on a rendered bitmap and an associated vector representation of the drawing stroke input in accordance with one or more implementations.

Although the modification input in the example of FIGS. 3 and 4 is an erase stroke, other modification inputs can be provided such as a select and move modification input and/or a smudge (blur) modification input, as shown respectively in FIGS. 5A and 5B.

FIG. 5A illustrates an example in which a user selects and moves a portion of the values of the displayed bitmap 208 from a first set of bitmap pixels to a second set of bitmap pixels. In the example of FIG. 5A, electronic device 115 receives a boundary input 500 corresponding to a boundary that encloses a portion 206B of the rendered and displayed bitmap 208. For example the user may utilize the device's touchscreen and/or a stylus to draw a circular or non-circular boundary around portion 206B. Responsively, electronic device 115 identifies the bitmap values of the bitmap pixels that are enclosed by the boundary. Then, as indicated by arrow 502, electronic device 115 receives a drag input that moves the boundary. Responsive to the drag input, electronic device 115 re-renders the bitmap values of the bitmap 208 that are enclosed by the boundary to at a location (e.g., a new set of bitmap pixels) determined based on the drag input, thereby separating portion 206B of the displayed bitmap from portion 206A. In this way, the bitmap operations of lassoing and moving portions of an electronic drawing are provided.

For illustrative purposes, FIG. 5A, as with FIG. 4, shows curve 210 of vector representation 216 overlaid on the bitmap 208, even though this curve may not be displayed to the user. In addition to the bitmap operations described above for the bitmap 208 in a selection and move operation, responsive to receiving the boundary input 500, electronic device 115 also identifies a portion of the vector representation 216 that is enclosed by the boundary (e.g., by intersecting the boundary with curve 210 to identify intersection points on the curve). For example, the same intersection techniques described above in connection with FIG. 4 (e.g., converting curve 210 to a polygon and performing Boolean intersection with the polygon) may be used to segment the curve 210.

Responsive to the received drag input indicated by arrow 502, electronic device applies a spatial offset to the bounded portion of the vector representation based on the drag input. For example, electronic device 115 may add a piecewise offset such as piecewise offset 504 at each intersection point and identify the new offset portion of the curve as invalid between new endpoints 520. Electronic device 115 stores the vector representation with the spatial offset applied to the portion of the vector representation, without rendering the vector representation for display. The moved parts of the vector representation are stored with an updated offset. In this way, selection and move operations are treated as a subtraction of the selected area and an addition of new vector strokes at the moved location. A handwriting recognition operation may then be performed (e.g., before and/or after the selection and move operation) that considers valid ranges 210P-210X of curve 210 as modified, but does not consider invalid offset ranges such as offset 504.

FIG. 5B illustrates an example in which a user provides a smudge stroke 521 that blurs a portion 522 of a displayed bitmap 208. As shown in the example of FIG. 5B, smudge stroke 521 intersects a portion of displayed bitmap 208, but does not intersect curve 210. In this example, the bitmap pixels of portion 522 are modified (e.g., by spreading the values of those bitmap pixels among those bitmap pixels and one or more adjacent or surrounding pixels such as by applying a low-pass spatial filter to the bitmap pixels), but curve 210 is unmodified. In this way, blurring or smudging of the displayed drawing is allowed, without affecting text recognition operations using curve 210.

In another example, a smudge stroke 521 can intersect curve 210 by passing further into, or entirely through, the rendered drawing stroke input. In this example, the same intersection techniques described above in connection with FIG. 4 (e.g., generating a smudge vector outline from smudge stroke 521, converting curve 210 to a polygon, and performing Boolean intersection of the smudge vector outline and the polygon to identify an intersected portion of curve 210) may be used to segment the curve 210. The portion of curve 210 that intersects the smudge stroke 521 can then be modified (e.g., by applying a reduced weight factor to that portion). In this way, a smudged portion of curve 210 can be provided with reduced weight for handwriting recognition operations.

In the examples described above in connection with FIGS. 2-5B, electronic drawing applications are provided in which a bitmap is displayed for user viewing and editing, and a vector representation is stored and modified in accordance with the edits to the displayed bitmap, and used for handwriting/character recognition. However, in some scenarios, an electronic drawing application may be provided in which enhanced vector representations are generated responsive to drawing stroke inputs (e.g., without generating any bitmap). The enhanced vector representations may include vector information that can be used for rendering and handwriting recognition and additional vector information that can be used to provide both bitmap-like and vector editing without generating a bitmap.

Figure 6:
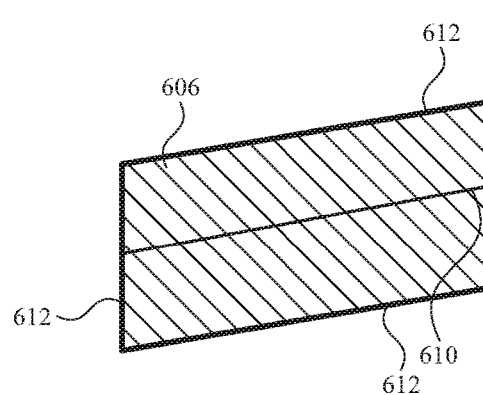
FIG. 6 illustrates a schematic diagram showing an enhanced vector representation of a drawing stroke input in accordance with one or more implementations.

FIG. 6 illustrates an example of an enhanced vector representation of a portion of a drawing stroke input such as drawing stroke input 202 of FIG. 2. When a device such as electronic device 115 receives a drawing stroke input 202, electronic device 115 may generate an enhanced vector representation of the drawing stroke input, the enhanced vector representation including a primary vector 610, which may be used as a handwriting-recognition vector. A handwriting-recognition vector may be a single curve at the center of the drawing stroke input. For example, primary vector 610 may include one or more control points and a curves such as a b-spline curve.

In the example of FIG. 6, the enhanced vector representation of the drawing stroke input also includes drawing vectors 612 that form a polygon with which a vector rendering 606 of the drawing stroke input can be generated. Primary vector 610 can be used, in some implementations, in combination with drawing vectors 612 to generate the vector rendering 606. For example, the vector stroke rendering may be bounded by the polygon formed from four (or less or more) drawing vectors 612. In this way, an enhanced vector representation is provided that can be used to provide bitmap-like editing capabilities, as further illustrated in FIGS. 7-9.

Figure 7:
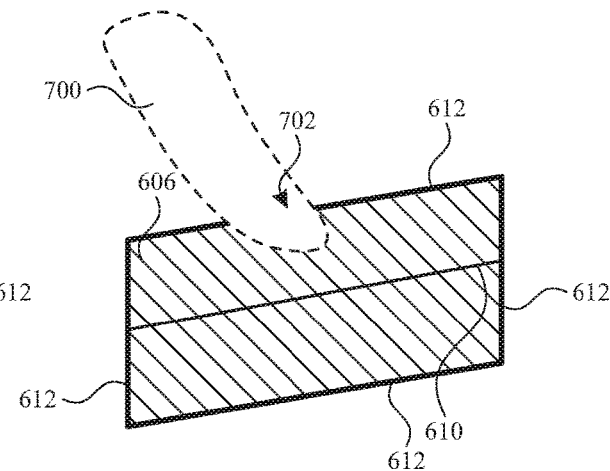
FIG. 7 illustrates a schematic diagram showing the effect of a partial erase stroke on an enhanced vector representation of a drawing stroke input in accordance with one or more implementations.

An electronic device such as electronic device 115 that has displayed a vector rendering 606 with an enhanced vector representation may receive a drawing modification stroke for the displayed vector rendering. In the example of FIG. 7, the drawing modification stroke is a partial erase stroke that intersects a portion 702 of the displayed vector rendering 606, but does not pass entirely through the displayed vector rendering. In this example, the device modifies at least one of the drawing vectors 612 without modifying the primary vector 610 (e.g., the handwriting-recognition vector), and modifies the vector rendering 606 based on the modified at least one of the drawing vector. For example, when the partial erase stroke is received, the device may generate and store an erase mask 700 corresponding to the partial erase stroke, intersect the erase mask with a polygon associated with the plurality of drawing vectors (e.g., by intersecting drawing vectors 612 with the erase mask using a Boolean operations library as described above), and modify any intersected drawing vectors 612 based on the intersecting (e.g., by invalidating a range of the intersected drawing vector 612 and setting portion 702 of the vector rendering to display background values in accordance with the invalid range and/or metadata describing the shape of the erased portion).

However, the example of FIG. 7 in which a modification stroke is a partial erase stroke is only one example of a modification stroke that can be used to edit the vector rendering 606. For example, FIG. 8 shows an example in which the modification stroke is a smudge stroke intended to smudge or blur portion 702 of vector rendering 606 rather than erasing that portion as in FIG. 6.

Figure 8:
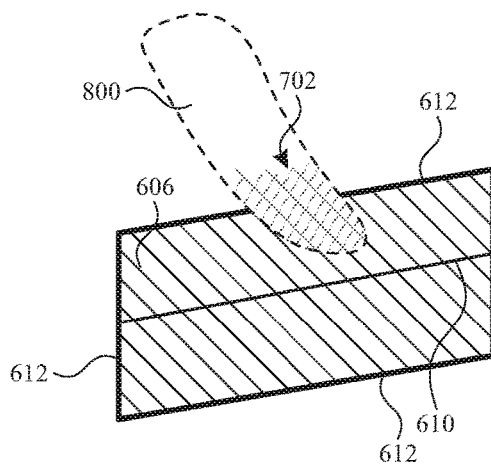
FIG. 8 illustrates a schematic diagram showing the effect of a smudge stroke on an enhanced vector representation of a drawing stroke input in accordance with one or more implementations.

In the example of FIG. 8, the device receives a smudge stroke, modifies at least one of the drawing vectors 612 without modifying the primary vector 610 (e.g., the handwriting-recognition vector), and modifies the vector rendering 606 based on the modified at least one of the drawing vector to show the intended smudge. For example, when a smudge stroke is received, the device may generate and store a smudge mask 800 corresponding to the smudge stroke, intersect the smudge mask with a polygon associated with the plurality of drawing vectors (e.g., by intersecting drawing vectors 612 with the smudge mask using a Boolean operations library as described above), and modify any intersected drawing vectors 612 based on the intersecting (e.g., by displaying a portion of the rendering that was previously displayed within the boundaries of the polygon formed by drawing vectors 612 outside of that polygon such as by reducing the brightness of pixels adjacent to one side of an intersected drawing vector 612 and correspondingly increasing the brightness of pixels adjacent an opposing side of that intersected drawing vector 612).

Figure 9:
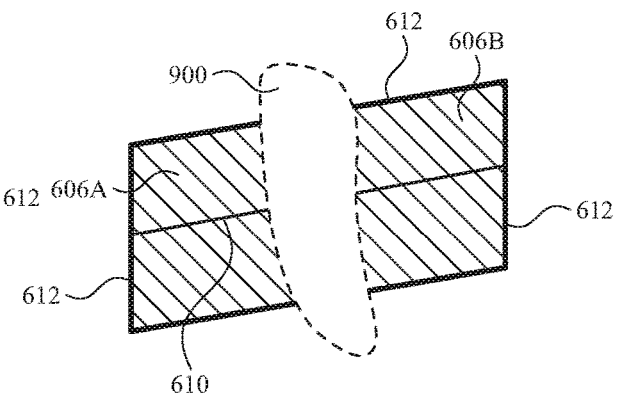
FIG. 9 illustrates a schematic diagram showing the effect of an erase stroke on an enhanced vector representation of a drawing stroke input in accordance with one or more implementations.

FIG. 9 shows another example of a drawing modification input to a rendered enhanced vector representation in which an erase stroke is received that entirely passes through vector rendering 606 at at least one location (e.g., bisecting at least a portion of the vector rendering into first and second portions 606A and 606B). In the example of FIG. 9, the erase stroke passes through primary vector 610 and two drawing vectors 612 on opposing sides of primary vector 610. In the example of FIG. 9, the device generates an erase mask 900, and each of primary vector 610 and drawing vectors 612 may be flattened (e.g., to form a polygon). The flattened vectors may be intersected with erase mask 900 and any intersected vectors may be modified as, for example, described for drawing vector 612 in connection with FIG. 7. The device may then modify the vector rendering 606 based on the modified drawing vectors and the modified primary vector.

In this example, one or more new drawing vectors 612 may be added following the erase stroke entry, to close the vector polygons around bisected portions 610A and 610B so that further modification inputs can be provided by the user (e.g., to erase or smudge the drawing at any location including at the new edges created by the complete erase stroke).

In any of the examples of FIGS. 7, 8 and 9, the masks (e.g., erase masks, smudge masks, etc.) may be stored for further rendering and/or editing. In any of the examples of FIGS. 7, 8, and 9, handwriting recognition operations can be performed, based on primary vector 610 and/or drawing vectors 612 before and/or after the erase or smudge modifications for recognizing at least one character based on the modified handwriting-recognition vector and/or the modified drawing vectors 612. For example, a user may erase a portion of a drawing stroke as in the example of FIG. 7 to make a hand drawn letter more clear to a viewer. In this example, recognizing text based on the modified drawing vector 612 may increase the accuracy with which the intended character is recognized.

The electronic drawing systems and methods described herein provide various solutions that allow a user to hand draw text and other content, seamlessly edit the drawing, and electronically recognize text (e.g., characters such as letters, numbers, and special characters) within the drawing. The text can be recognized periodically, responsive to a user's request, or responsive to a new input or a modification of the drawing. The recognized text that has been hand drawn, can, if desired, be replaced by vector rendered text.

Figure 10:
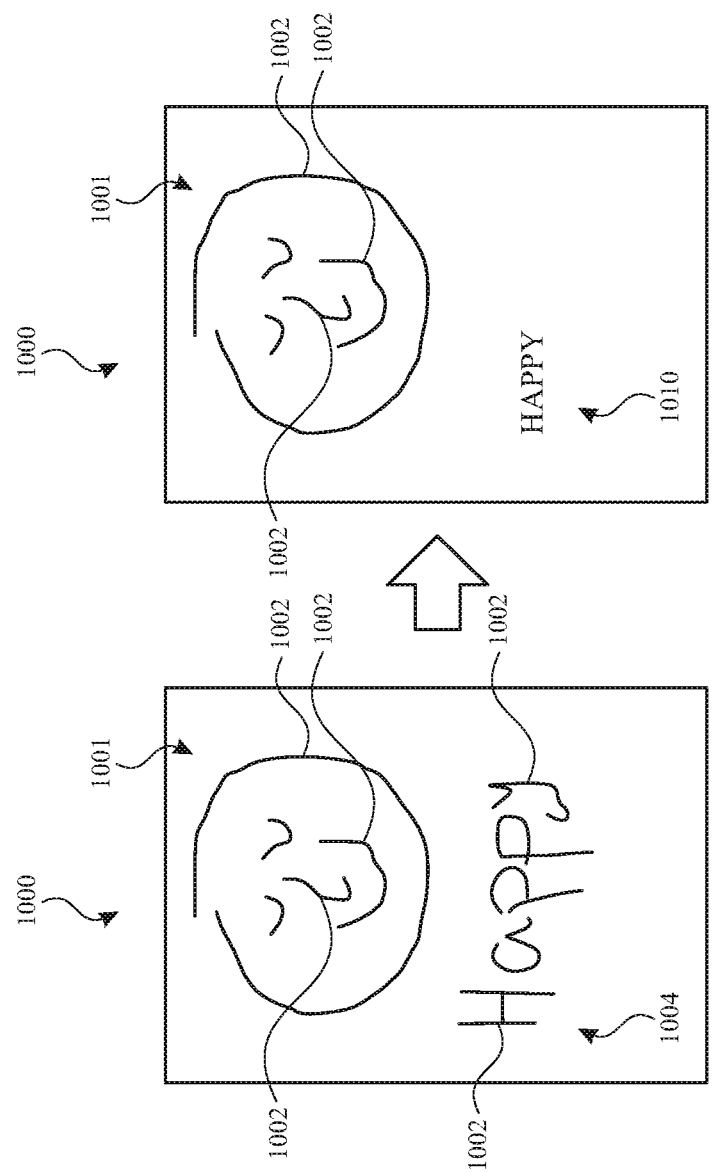
FIG. 10 illustrates a schematic diagram showing character recognition in an editable freehand drawing in accordance with one or more implementations.

FIG. 10 shows an example in which hand drawn text in an electronic drawing is replaced with vector rendered text. In the example of FIG. 10, a user has generated a hand-drawn electronic drawing 1000 that includes drawing strokes 1002 forming a drawing 1001 of a happy face and includes drawing strokes 1002 forming a drawing 1004 of the word "happy". The displayed electronic drawing 1000 may be displayed based on a bitmap generated from the user's input strokes (as in the examples of FIGS. 2-4) or based on an enhanced vector representation (as in the examples of FIGS. 6-9). In either case, the drawing is editable to erase, smudge, or otherwise modify the drawing, and background vector representations of the drawing stroke inputs are stored. When handwriting recognition is performed, drawing strokes 1002 corresponding to drawing 1004 are recognized as characters, and drawing strokes 1002 corresponding to drawing 1001 may be identified as non-character drawing strokes. If replacement of hand drawn characters is performed, drawing strokes 1002 that are recognized as portions of characters can be replaced in electronic drawing 1000 with vector representations 1010 of the recognized characters of the word "happy" as shown, while continuing to display drawing strokes 1002 of happy face drawing 1001 as hand drawn strokes (e.g., as bitmap values or enhanced vector renderings).

Figure 11:
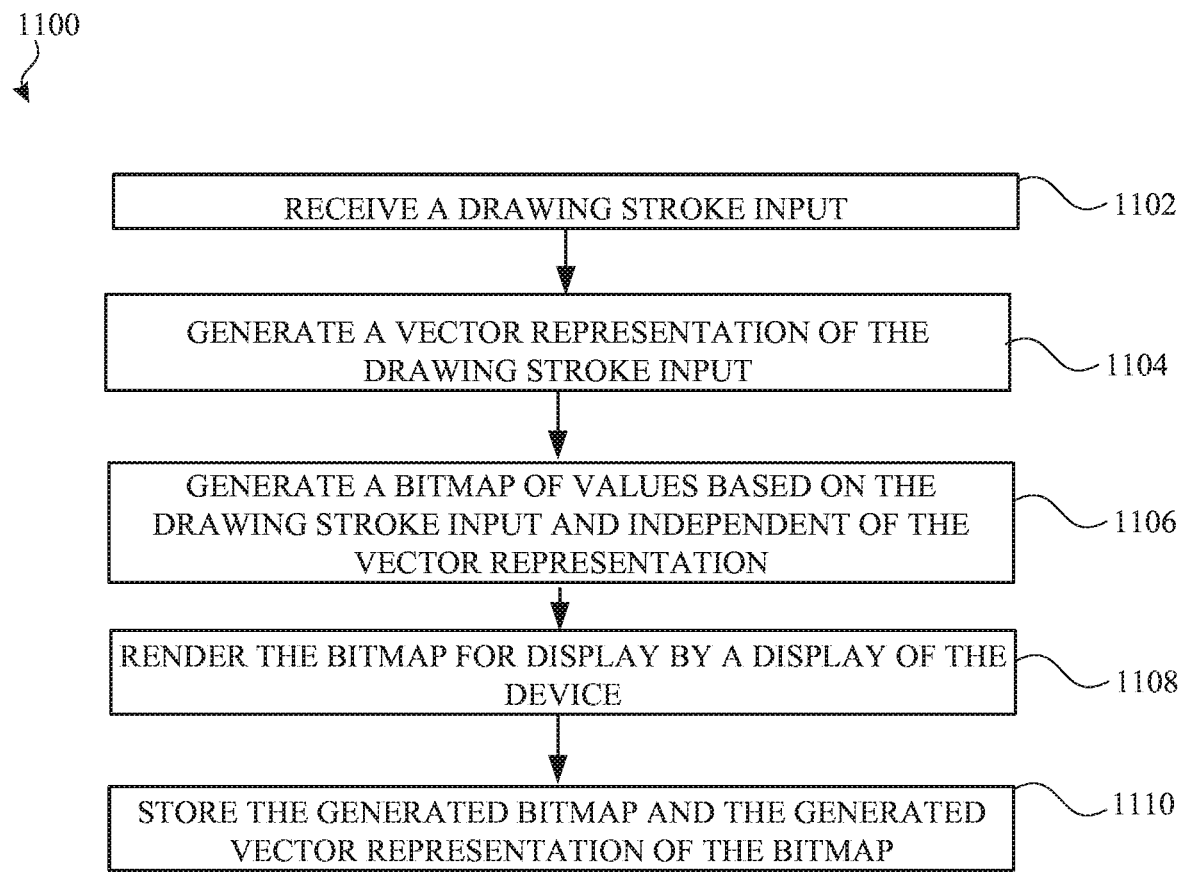
FIG. 11 illustrates a flow diagram of an example process for electronic drawing using bitmap rendering and editing and vector handwriting recognition in accordance with one or more implementations.

FIG. 11 illustrates a flow diagram of an example process 1100 for electronic drawing with bitmap drawing and vector handwriting recognition in accordance with one or more implementations. For explanatory purposes, the process 1100 is primarily described herein with reference to one or more devices of FIG. 1 (particularly with reference to electronic device 115), which may be executed by one or more processors of the electronic device 115 of FIG. 1.

However, the process 1100 is not limited to the electronic device 115, and one or more blocks (or operations) of the process 1100 may be performed by one or more other components of other suitable devices, such as one or more of the electronic device 110, or the server 120. Further for explanatory purposes, the blocks of the process 1100 are described herein as occurring in serial, or linearly. However, multiple blocks of the process 1100 may occur in parallel. In addition, the blocks of the process 1100 need not be performed in the order shown and/or one or more blocks of the process 1100 need not be performed and/or can be replaced by other operations.

At block 1102, a device such as electronic device 115 receives a drawing stroke input (e.g., as described above in connection with drawing stroke input 202 of FIG. 2). At block 1104, the device generates a vector representation such as vector representation 216 of the drawing stroke input (e.g., as described above in connection with FIG. 2).

At block 1106, the device generates a bitmap of values such as bitmap 208 of values 206 of FIG. 2, based on the drawing stroke input and independent of the vector representation (e.g., as described above in connection with FIG. 2). The vector representation may include less than sufficient information for rendering a vector drawing that matches the bitmap rendering. At block 1108, the device renders the bitmap for display by a display such as display 200 of the device (e.g., as described above in connection with FIG. 2).

At block 1110, the device stores the generated bitmap and the generated vector representation of the bitmap. As described above in connection with, for example, FIGS. 3-5, the rendered bitmap may be displayed and editable using erase, smudge, select and move, or other bitmap drawing operations, while the underlying (hidden) vector representation is modified to incorporate the bitmap drawing operations for handwriting recognition operations.

Figure 12:
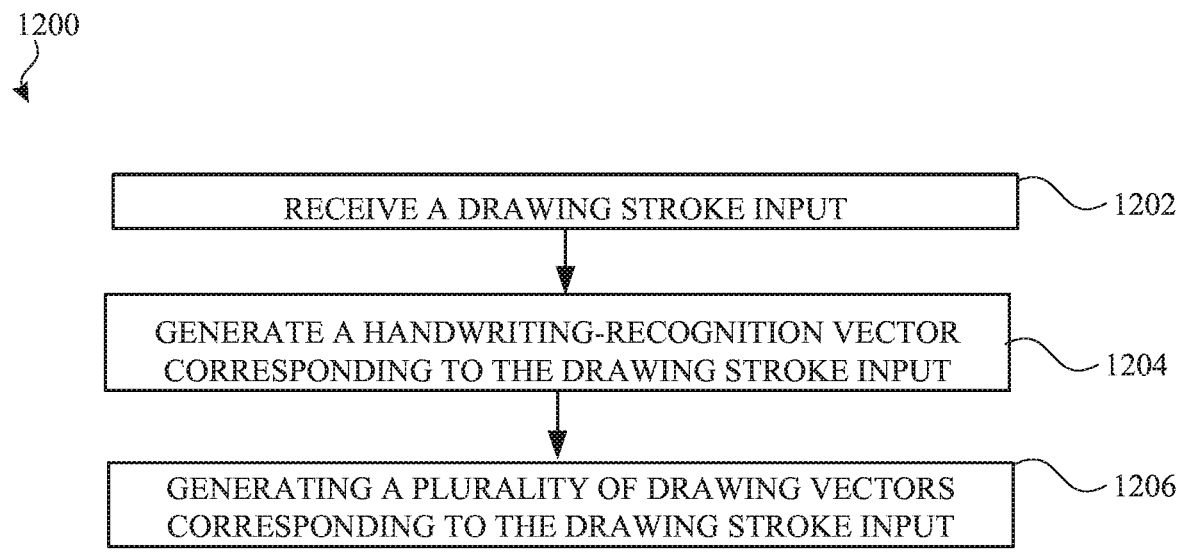
FIG. 12 illustrates a flow diagram of an example process for electronic drawing using enhanced vector drawing in accordance with one or more implementations.

FIG. 12 illustrates a flow diagram of an example process 1200 for electronic drawing with enhanced vector drawing in accordance with one or more implementations. For explanatory purposes, the process 1200 is primarily described herein with reference to one or more devices of FIG. 1 (particularly with reference to electronic device 115), which may be executed by one or more processors of the electronic device 115 of FIG. 1. However, the process 1200 is not limited to the electronic device 115, and one or more blocks (or operations) of the process 1200 may be performed by one or more other components of other suitable devices, such as one or more of the electronic device 110, or the server 120. Further for explanatory purposes, the blocks of the process 1200 are described herein as occurring in serial, or linearly. However, multiple blocks of the process 1200 may occur in parallel. In addition, the blocks of the process 1200 need not be performed in the order shown and/or one or more blocks of the process 1200 need not be performed and/or can be replaced by other operations.

At block 1202, an electronic device such as electronic device 110 receives a drawing stroke input (e.g., as described above in connection with drawing stroke input 202 of FIG. 2). At block 1204, the electronic device generates a handwriting-recognition vector such as primary vector 610 corresponding to the drawing stroke input (e.g., as described above in connection with FIG. 6).

At block 1206, the electronic device generates one or more drawing vectors such as drawing vectors 612 corresponding to the drawing stroke input (e.g., as described above in connection with FIG. 6). The electronic device may then render the vector representation of the drawing stroke input for display based on the handwriting-recognition vector and/or the drawing vectors. As described above in connection with, for example FIGS. 6-9, the handwriting-recognition vector may be represented by one or more control points and a curve that can be used for handwriting recognition and/or for rendering a visual representation of the drawing stroke input on the display. As described above in connection with, for example FIGS. 6-9, the drawing vectors may be used for rendering the visual representation of the drawing stroke input on the display in such a way that drawing operations such as erasing and smudging, typically only available for bitmap drawing, can be executed by the user, along with handwriting recognition and other vector drawing features such as moving or scaling pieces of the drawing.

Figure 13:
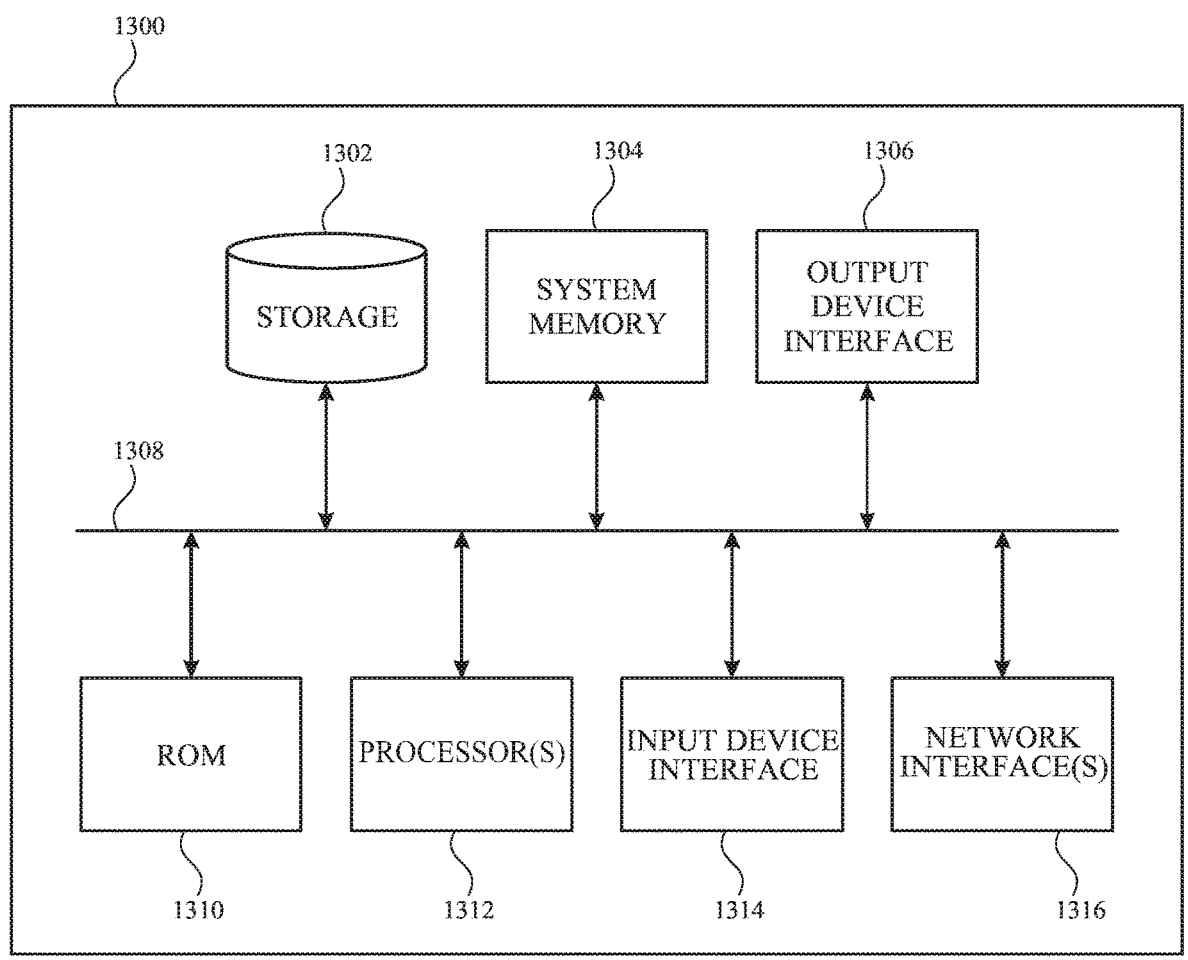
FIG. 13 illustrates an electronic system with which one or more implementations of the subject technology may be implemented.

FIG. 13 illustrates an electronic system 1300 with which one or more implementations of the subject technology may be implemented. The electronic system 1300 can be, and/or can be a part of, the electronic device 110, the electronic device 115, and/or the server 120 shown in FIG. 1. The electronic system 1300 may include various types of computer readable media and interfaces for various other types of computer readable media. The electronic system 1300 includes a bus 1308, one or more processing unit(s) 1312, a system memory 1304 (and/or buffer), a ROM 1310, a permanent storage device 1302, an input device interface 1314, an output device interface 1306, and one or more network interfaces 1316, or subsets and variations thereof.

The bus 1308 collectively represents all system, peripheral, and chipset buses that communicatively connect the numerous internal devices of the electronic system 1300. In one or more implementations, the bus 1308 communicatively connects the one or more processing unit(s) 1312 with the ROM 1310, the system memory 1304, and the permanent storage device 1302. From these various memory units, the one or more processing unit(s) 1312 retrieves instructions to execute and data to process in order to execute the processes of the subject disclosure. The one or more processing unit(s) 1312 can be a single processor or a multi-core processor in different implementations.

The ROM 1310 stores static data and instructions that are needed by the one or more processing unit(s) 1312 and other modules of the electronic system 1300. The permanent storage device 1302, on the other hand, may be a read-and-write memory device. The permanent storage device 1302 may be a non-volatile memory unit that stores instructions and data even when the electronic system 1300 is off. In one or more implementations, a mass-storage device (such as a magnetic or optical disk and its corresponding disk drive) may be used as the permanent storage device 1302.

In one or more implementations, a removable storage device (such as a floppy disk, flash drive, and its corresponding disk drive) may be used as the permanent storage device 1302. Like the permanent storage device 1302, the system memory 1304 may be a read-and-write memory device. However, unlike the permanent storage device 1302, the system memory 1304 may be a volatile read-and-write memory, such as random access memory. The system memory 1304 may store any of the instructions and data that one or more processing unit(s) 1312 may need at runtime. In one or more implementations, the processes of the subject disclosure are stored in the system memory 1304, the permanent storage device 1302, and/or the ROM 1310. From these various memory units, the one or more processing unit(s) 1312 retrieves instructions to execute and data to process in order to execute the processes of one or more implementations.

The bus 1308 also connects to the input and output device interfaces 1314 and 1306. The input device interface 1314 enables a user to communicate information and select commands to the electronic system 1300. Input devices that may be used with the input device interface 1314 may include, for example, alphanumeric keyboards and pointing devices (also called "cursor control devices"). The output device interface 1306 may enable, for example, the display of images generated by electronic system 1300. Output devices that may be used with the output device interface 1306 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 13, the bus 1308 also couples the electronic system 1300 to one or more networks and/or to one or more network nodes, such as the electronic device 115 shown in FIG. 1, through the one or more network interface(s) 1316. In this manner, the electronic system 1300 can be a part of a network of computers (such as a LAN, a wide area network ("WAN"), or an Intranet, or a network of networks, such as the Internet. Any or all components of the electronic system 1300 can be used in conjunction with the subject disclosure.

In accordance with various aspects of the subject disclosure, a device is provided that includes at least one processor configured to receive a drawing stroke input. The at least one processor is further configured to generate a vector representation of the drawing stroke input. The at least one processor is further configured to generate a bitmap of values based on the drawing stroke input and independent of the vector representation. The at least one processor is further configured to render the bitmap for display by a display of the device. The at least one processor is further configured to store the generated bitmap to facilitate bitmap editing operations, and to store the generated vector representation to facilitate recognition of text associated with the drawing stroke input.

In accordance with various aspects of the subject disclosure, a computer-implemented method is provided that includes receiving a drawing stroke input. The method also includes generating a bitmap of values that represent the drawing stroke input. The method also includes rendering the bitmap for display by a display of an electronic device. The method also includes generating a vector representation of the drawing stroke input based on the bitmap. The method also includes storing the generated bitmap for bitmap editing operations. The method also includes storing the generated vector representation of the bitmap, to facilitate character recognition with respect to the drawing stroke input.

In accordance with various aspects of the subject disclosure, a non-transitory computer-readable medium is provided that includes instructions, which when executed by at least one computing device, cause the at least one computing device to perform operations including receiving a drawing stroke input, generating a handwriting-recognition vector corresponding to the drawing stroke input to facilitate handwriting recognition operations for the drawing stroke input, and generating a plurality of drawing vectors corresponding to the drawing stroke input to facilitate editing of a rendering of the drawing stroke input.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the phrase "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device, comprising:
   at least one processor configured to:
   receive a drawing stroke input;
   generate a vector representation of the drawing stroke input,
   wherein the vector representation includes a b-spline curve and is free of visual representation metadata comprising a line style, a line thickness, a texture, and a color;
   generate a bitmap of values based on the drawing stroke input and independent of the vector representation and any vector representation of the drawing stoke input;
   render the bitmap for display by a display of the device;
   store the generated bitmap to facilitate bitmap editing operations;
   store the generated vector representation to facilitate recognition of text associated with the drawing stroke input; and
   recognize the text associated with the drawing stroke input based on the stored vector representation and without use of the bitmap.

2. The device of claim 1, wherein the at least one processor is configured to receive the drawing stroke input from a touchscreen, a touchpad, or a stylus device communicatively coupled to the device.

3. The device of claim 1, wherein the at least one processor is further configured to:
   receive a modification input for the drawing stroke input;

modify the stored vector representation based on the modification input; and modify the values of the stored bitmap based on the modification input and independent of the modification to the stored vector representation.

4. The device of claim 3, wherein the modification input comprises an erase stroke that intersects at least a portion of the rendered bitmap, and the at least one processor is further configured to:

modify the values of the stored bitmap by setting values of the at least the portion of the bitmap that intersects the erase stroke to background values; and modify the stored vector representation by splitting the stored vector representation into a first portion on a first side of the erase stroke and a second portion on a second side of the erase stroke.

5. The device of claim 4, wherein the vector representation comprises a b-spline curve corresponding to the drawing stroke input, and wherein the at least one processor is configured to split the stored vector representation into the first portion on the first side of the erase stroke and the second portion on the second side of the erase stroke by:

converting the erase stroke to a vector outline;
converting the b-spline curve to a polygon;
intersecting the vector outline and the polygon; and
obtaining endpoints for first and second valid ranges of the b-spline curve, based on the intersection, wherein the first and second valid ranges correspond to the first and second portions.

6. The device of claim 3, wherein the at least one processor is further configured to:

recognize the text associated with the drawing stroke input based on the vector representation prior to receiving the modification input; and recognize the text associated with the drawing stroke input based on the modified vector representation after receiving the modification input.

7. The device of claim 1, wherein the at least one processor is further configured to:

receive a modification input for the drawing stroke input, wherein the modification input comprises a smudge stroke that intersects at least a portion of the rendered bitmap; and modify the values of the stored bitmap by spreading the values of the at least the portion of the bitmap that intersects the smudge stroke, without modifying the stored vector representation.

8. The device of claim 1, wherein the at least one processor is further configured to:

recognize at least one character based on the stored vector representation;

receive a request to display the at least one recognized character; and replace, responsive to the request, a first portion of the rendered bitmap with a vector rendering of the recognized at least one character, while maintaining a second portion of the rendered bitmap.

9. The device of claim 1, further comprising a display having an array of display pixels, wherein the at least one processor is further configured to operate the array of display pixels to display the rendered bitmap independent of the stored vector representation.

10. The device of claim 1, wherein the vector representation includes insufficient information with which to render, for display, a representation of the drawing stroke input that visually matches the rendered bitmap.

11. The device of claim 1, further comprising the display, wherein the display comprises:

an array of display pixels; and
a corresponding array of touch sensor electrodes.

12. The device of claim 11, wherein the at least one processor is configured to receive the drawing stroke input with the array of touch sensor electrodes.

13. The device of claim 12, wherein the at least one processor is configured to operate the array of display pixels to display the rendered bitmap, wherein the drawing stroke input comprises sensor signals from the touch sensor electrodes, and wherein the vector representation of the drawing stroke input comprises a mathematical representation of a curve.

14. A computer-implemented method, comprising:

receiving a drawing stroke input;
generating a bitmap of values that represent the drawing stroke input;
rendering the bitmap for display by a display of an electronic device;
generating a vector representation of the drawing stroke input using the values of the bitmap, wherein the vector representation includes a b-spline curve and is free of visual representation metadata comprising a line style, a line thickness, a texture, and a color;
storing the generated bitmap for bitmap editing operations; and
storing the generated vector representation of the bitmap, to facilitate character recognition with respect to the drawing stroke input,
wherein the stored vector representation includes insufficient information with which to render, for display, a representation of the drawing stroke input that visually matches the rendered bitmap.

15. The computer-implemented method of claim 14, further comprising:

receiving a boundary input corresponding to a boundary that encloses a portion of the rendered bitmap;
identifying bitmap values of the bitmap that are enclosed by the boundary;
receiving a drag input that moves the boundary; and
re-rendering the identified bitmap values at a location determined based on the drag input.

16. The computer-implemented method of claim 15, further comprising:

identifying a portion of the vector representation that is enclosed by the boundary;
applying a spatial offset to the portion of the vector representation based on the drag input; and
storing the vector representation with the spatial offset applied to the portion of the vector representation, without rendering the vector representation for display.

17. The computer-implemented method of claim 14, wherein the insufficient information with which to render, for display, the representation of the drawing stroke input that visually matches the rendered bitmap comprises curve information without including width information.

18. A device, comprising:

at least one processor configured to:
receive a drawing stroke input;
generate a vector representation of the drawing stroke input;
generate a bitmap of values based on the drawing stroke input and independent of the vector representation;
render the bitmap for display by a display of the device;

store the generated bitmap to facilitate bitmap editing operations;

store the generated vector representation to facilitate recognition of text associated with the drawing stroke input;

receive a modification input stroke for the drawing stroke input, wherein the modification input stroke intersects at least a portion of the rendered bitmap;

modify the values of the stored bitmap by setting values of the at least the portion of the bitmap that intersects the modification input stroke to modified values;

convert the modification input stroke to a vector outline;

convert a curve of the stored vector representation to a polygon; and modify the stored vector representation by splitting the stored vector representation into a first portion on a first side of the modification input stroke and a second portion on a second side of the modification input stroke based on an intersection of the vector outline and the polygon.

19. The device of claim 18, wherein the modification input stroke comprises an erase stroke, and wherein the modified values of the bitmap comprise background values.

20. The device of claim 18, wherein the at least one processor is further configured to receive a smudge input stroke that intersects at least another portion of the rendered bitmap.

21. The device of claim 20, wherein the at least one processor is further configured to modify additional values of the stored bitmap by spreading the values of the at least the other portion of the bitmap that intersects the smudge stroke, without further modifying the stored vector representation.

22. The device of claim 18, wherein splitting the stored vector representation into the first portion on the first side of the modification input stroke and the second portion on the second side of the modification input stroke based on the intersection of the vector outline and the polygon comprises obtaining endpoints for first and second valid ranges of the curve, based on the intersection.

23. The device of claim 22, wherein the first and second valid ranges correspond to the first and second portions.

24. The device of claim 18, wherein the curve of the vector representation comprises a b-spline curve corresponding to the drawing stroke input.

* * * * *

UNITED STATES PATENT AND TRADEMARK OFFICE
CERTIFICATE OF CORRECTION

| | |
|---|---|
| PATENT NO. | : 11,380,028 B2 |
| APPLICATION NO. | : 16/025931 |
| DATED | : July 5, 2022 |
| INVENTOR(S) | : William J. Thimbleby |

It is certified that error appears in the above-identified patent and that said Letters Patent is hereby corrected as shown below:

In the Claims

Column 16, Line 51 Claim 2 Replace "stoke" with --stroke--.

Signed and Sealed this
Twenty-second Day of August, 2023

*Katherine Kelly Vidal*

Katherine Kelly Vidal
*Director of the United States Patent and Trademark Office*